United States Patent
Moerig

(10) Patent No.: US 7,260,021 B1
(45) Date of Patent: Aug. 21, 2007

(54) METHOD OF HARMONIC NOISE ATTENUATION IN CORRELATED SWEEP DATA

(75) Inventor: Rainer Moerig, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 507 days.

(21) Appl. No.: 10/338,359

(22) Filed: Jan. 8, 2003
(Under 37 CFR 1.47)

(51) Int. Cl.
G01V 1/36 (2006.01)
G01V 1/37 (2006.01)

(52) U.S. Cl. .......................... 367/41; 367/38; 367/40; 367/42; 181/111; 181/112

(58) Field of Classification Search ................. 367/15, 367/21, 38–42, 189; 702/17; 181/111–112, 181/114
See application file for complete search history.

(56) References Cited

U.S. PATENT DOCUMENTS

| | | | | |
|---|---|---|---|---|
| 4,206,509 A | * | 6/1980 | Ruehle | 367/42 |
| 4,823,326 A | * | 4/1989 | Ward | 367/41 |
| 5,051,963 A | | 9/1991 | Linville, Jr. et al. | 367/46 |
| 5,410,517 A | | 4/1995 | Andersen | 367/75 |
| 5,721,710 A | * | 2/1998 | Sallas et al. | 367/41 |
| 5,764,516 A | * | 6/1998 | Thompson et al. | 702/17 |
| 6,161,076 A | * | 12/2000 | Barr et al. | 702/17 |
| 6,393,365 B1 | * | 5/2002 | Runnestrand et al. | 702/17 |
| 6,631,783 B2 | * | 10/2003 | Khan | 181/108 |
| 6,704,245 B2 | * | 3/2004 | Becquey | 367/39 |

FOREIGN PATENT DOCUMENTS

| | | | |
|---|---|---|---|
| WO | WO 00/57208 | * | 9/2000 |
| WO | WO 01/61379 | * | 8/2001 |
| WO | WO 03/073129 A1 | | 9/2003 |

OTHER PUBLICATIONS

Jeffryes. "Far-field harmonic measurement for seismic vibrators." 66$^{th}$ Annual meeting of the SEG, Nov. 10-15, 1996.*
International Search Report PCT/US 03/34313 dated Apr. 20, 2004.
Okaya, David et al., "Removing vibrator-induced correlation artifacts by filtering in frequency-uncorrelated time space," *Geophysics*, vol. 57, No. 7, pp. 916-926, Jul. 1992.

* cited by examiner

*Primary Examiner*—Jack Keith
*Assistant Examiner*—Scott A. Hughes

(57) ABSTRACT

The present invention provides a method for harmonic noise attenuation in correlated sweep data in seismic exploration. The method includes forming a plurality of correlation data subsets using a plurality of sweep data sets and a correlation reference sequence. The method further includes estimating a noise level in a correlation data set using the correlation data subsets and subtracting the estimated noise level from the correlation data set.

4 Claims, 9 Drawing Sheets

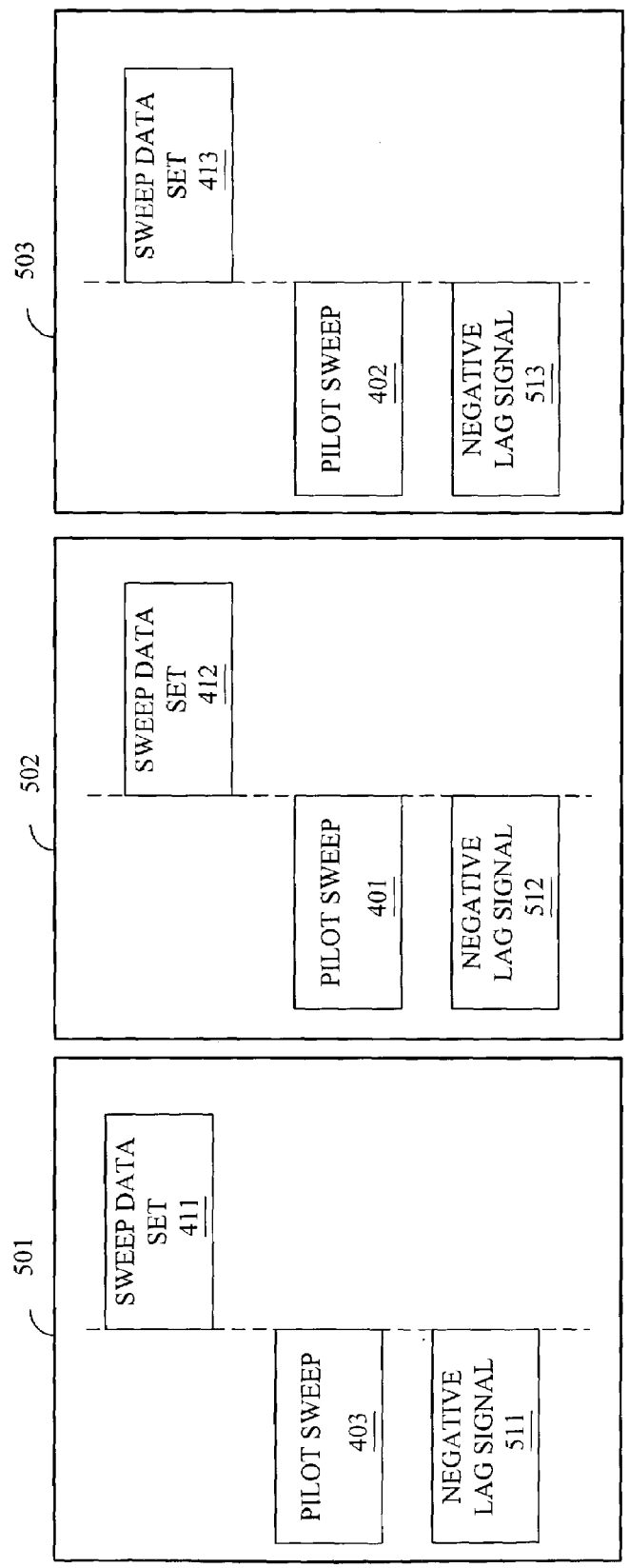

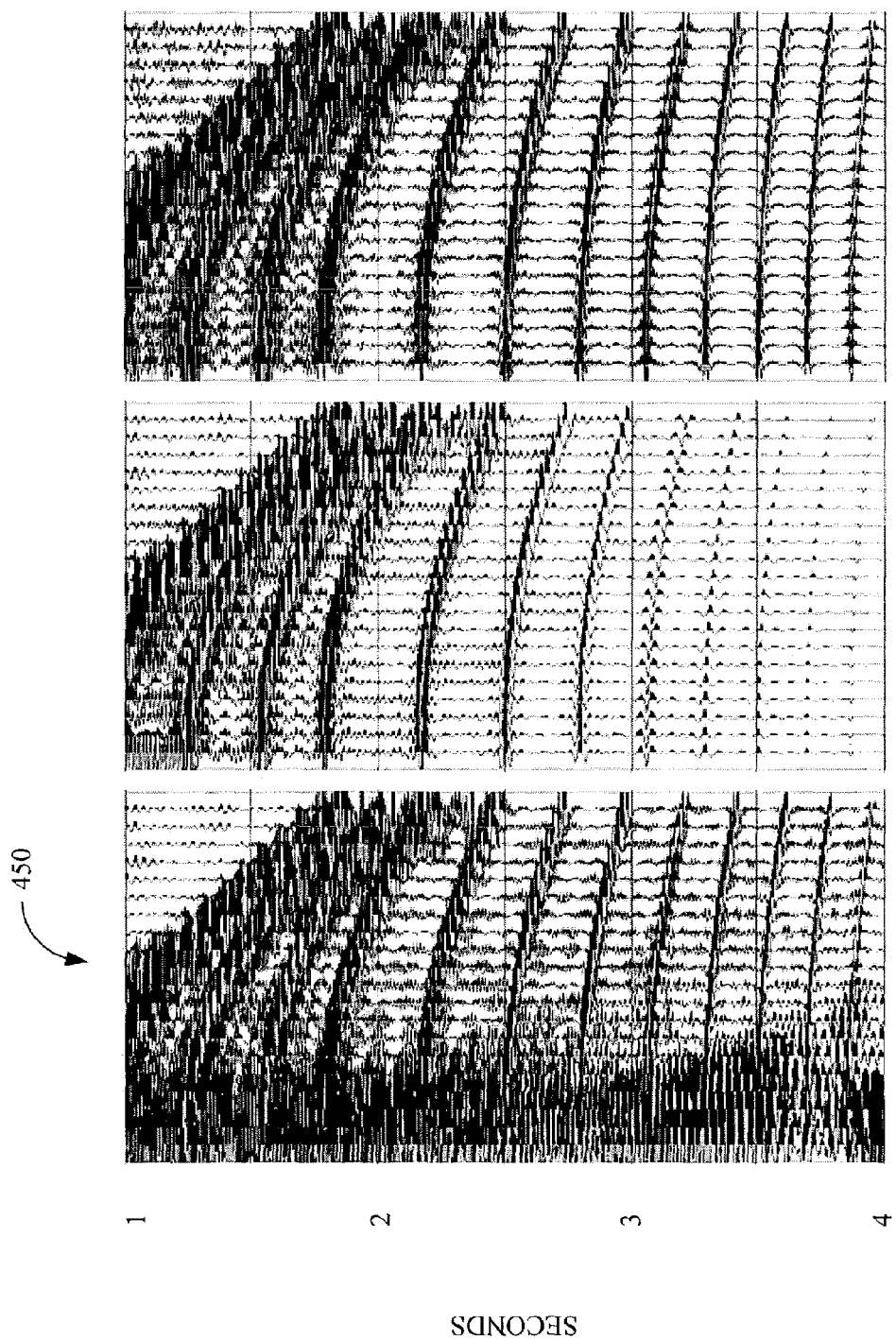

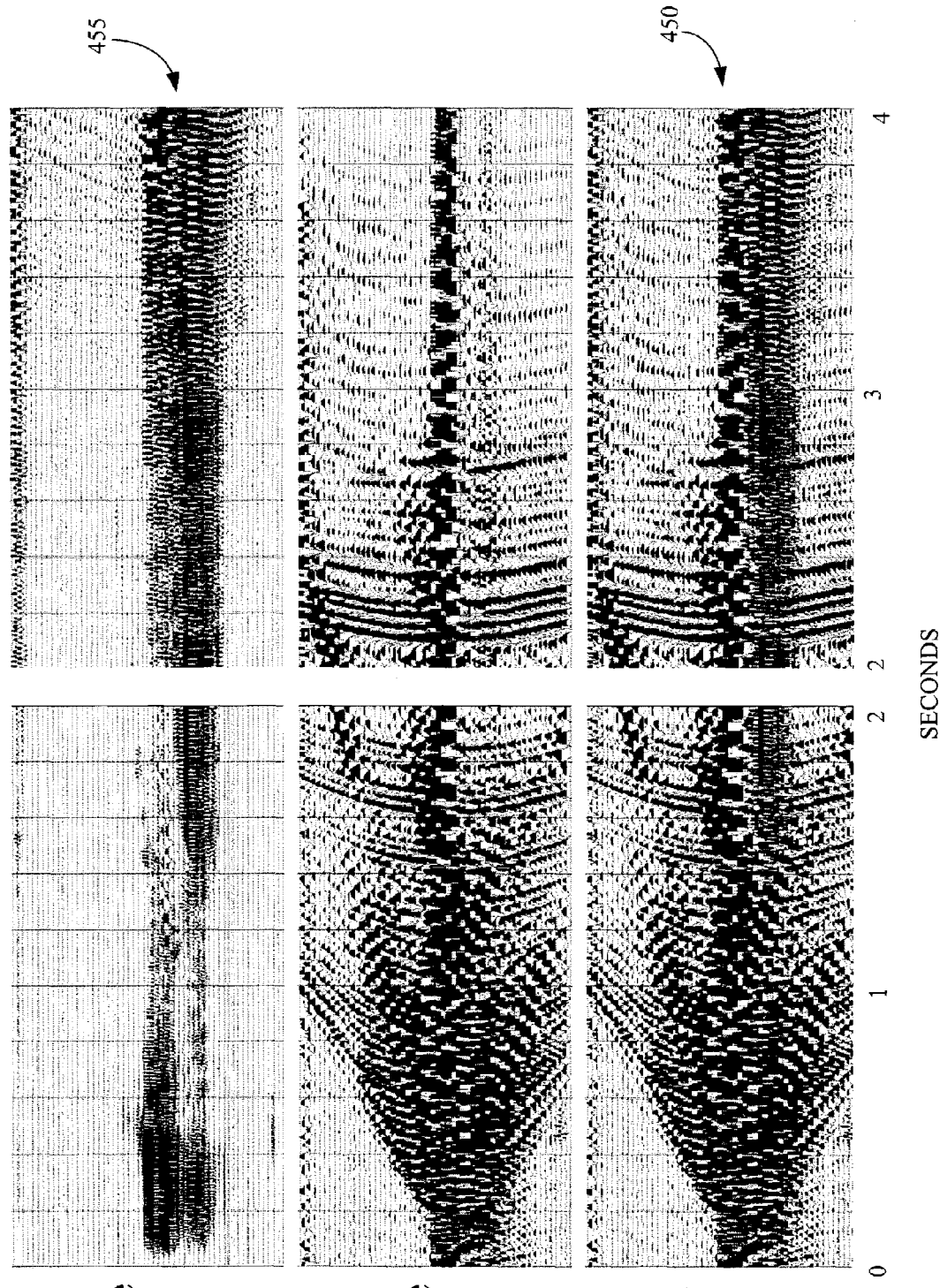

METHOD OF HARMONIC NOISE ATTENUATION IN CORRELATED SWEEP DATA

BACKGROUND OF THE INVENTION

1. Field of the Invention

This invention relates generally to seismic exploration, and, more particularly, to harmonic noise attenuation in correlated sweep data in seismic exploration.

2. Description of the Related Art

Seismic exploration is widely used to locate and/or survey subterranean geological formations for hydrocarbon deposits. A survey typically involves deploying one or more vibrators, such as a thumper, and one or more seismic sensors, such as hydrophones or geophones, at predetermined locations. For example, a thumper may be used to drive an acoustic wave into the ground. The acoustic wave may be reflected by subterranean geologic formations and propagate back to one or more geophones. The geophones receive the reflected waves, which are then processed to generate seismic data. Analysis of the seismic data may indicate probable locations of geological formations such as hydrocarbon deposits.

In traditional seismic exploration, the vibrator uses a so-called "pilot sweep", which is generally provided by a vibrator electronics package, to emit an acoustic signal, sometimes referred to as a "sweep," for a selected period of time. Following each sweep, the vibrator stops to allow the seismic sensors to "listen" for the reflected signal. For example, the vibrator emits the acoustic signal for about 4 seconds and then stops emitting the acoustic signal for a listening period of about 4 seconds. The seismic sensors receive and record the reflected signal, which may be cross-correlated with the pilot sweep to create a map of nearby subterranean geologic features.

Mapping a large area using single sweeps, which are each followed by a listening period may be time-consuming. For example, a single survey of a few hundred square miles typically requires several months to complete. To try and reduce the survey time, engineers have proposed a variety of techniques, including a cascaded sweep. In a cascaded sweep, the vibrator emits a plurality of sweeps with no listening period between them. After all the cascaded sweeps have been completed, the vibrator stops for a listening period. The seismic sensor receives, and records, the reflected signal during each of the sweeps and the listening period. The recorded data from the listening period and each sweep may then be cross-correlated to create a subterranean map of the surveyed area.

A slip sweep may also be used to reduce the survey time. In a slip sweep, vibrators are deployed in the survey area. A first vibrator begins emitting a first sweep and then, a preselected time later, a second vibrator begins emitting a second sweep. In one embodiment, the preselected time is shorter than the duration of the first sweep, so the second sweep begins before the first sweep has completed. After the desired number of slip sweeps is complete, the vibrators stop emitting sweeps for a listening period. As in the cascaded sweep, the seismic sensor receives, and records, the reflected signal during each of the sweeps and the listening period.

Despite the acknowledged potential to reduce the survey time, a number of technical difficulties may inhibit the widespread adoption of the cascaded sweep or slip sweep technology for seismic exploration. In particular, the vibrator generally introduces harmonic noise into the sweep. The amplitude of the harmonic noise may be comparable to or greater than the reflected signal and may thus make it difficult to separate the reflected signal from the harmonic noise. Amplitude and/or phase errors in the acoustic signal provided by the vibrator may also make it difficult to remove the harmonic noise by traditional methods, such as stacking multiple data sets. The noise degrades the quality of the cross-correlation, in some cases obscuring the geologic formations that seismic exploration is supposed to detect.

SUMMARY OF THE INVENTION

In one aspect of the instant invention, a method is provided for harmonic noise attenuation in correlated sweep data in seismic exploration. The method includes forming a plurality of correlation data subsets using a plurality of sweep data sets and a correlation reference sequence. The method further includes estimating a noise level in a correlation data set using the correlation data subsets and subtracting the estimated noise level from the correlation data set.

In another aspect of the instant invention, an apparatus is provided for harmonic noise attenuation in correlated sweep data in seismic exploration. The apparatus includes a correlator adapted to form a correlation data set. The apparatus further includes a noise estimator adapted to estimate a noise level in the correlation data set using a plurality of correlation data subsets and an attenuator adapted to subtract the estimated noise level from the correlation data set.

BRIEF DESCRIPTION OF THE DRAWINGS

The invention may be understood by reference to the following description taken in conjunction with the accompanying drawings, in which like reference numerals identify like elements, and in which:

FIG. 5 shows correlation data subsets that may be used to estimate noise in the cascaded sweep data shown in FIG. 4;

FIGS. 8A-C depict exemplary correlated data sets that may be produced by the methods shown in FIGS. 6 and 7; and FIGS. 9A-C show a second exemplary correlation data set formed using actual field data, the second exemplary correlation data set with harmonic noise attenuated, and an estimate of the harmonic noise in the correlation data set, respectively.

Figure 1:
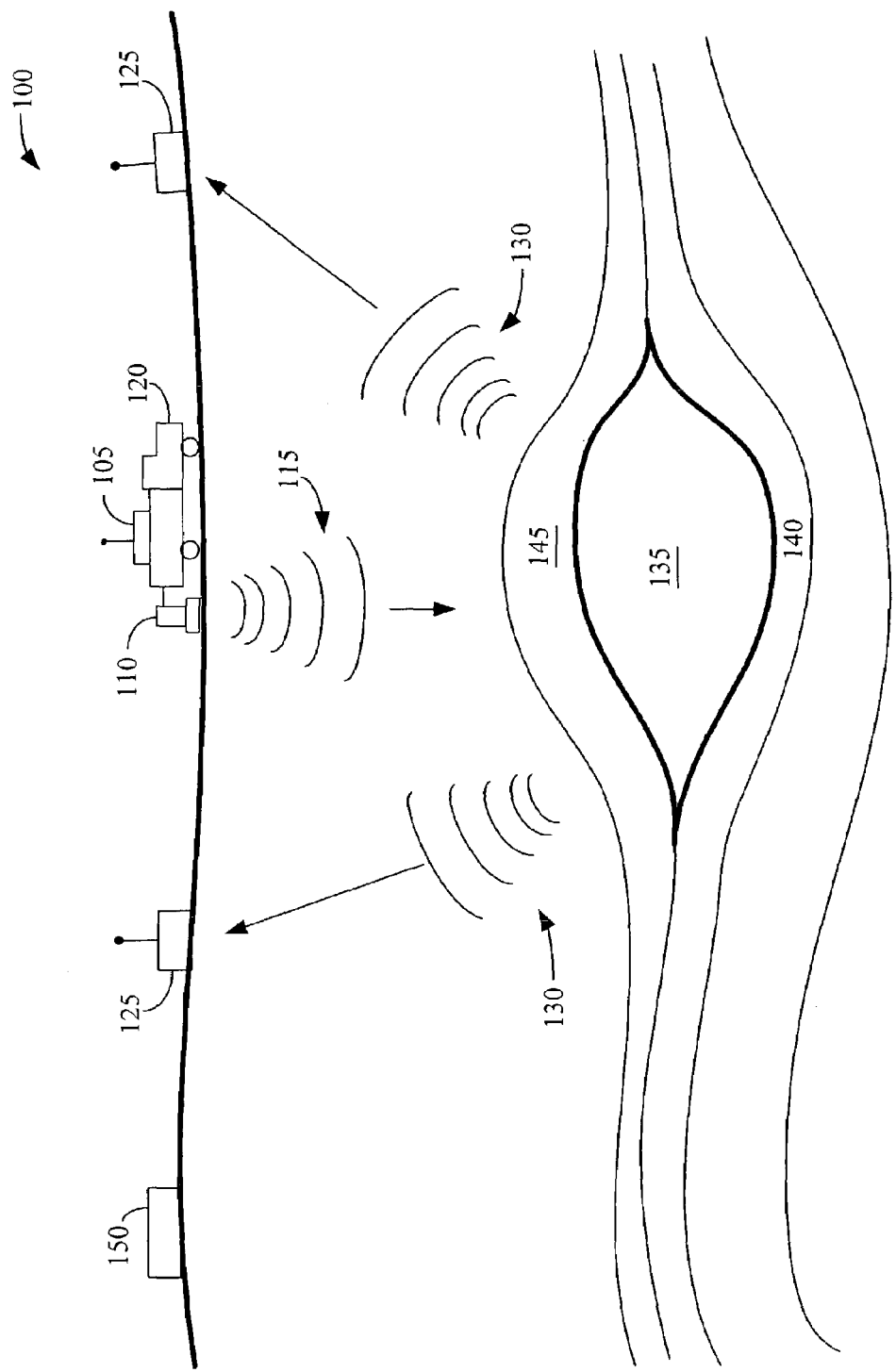
FIG. 1 shows a system for seismic exploration.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a system 100 for seismic exploration is shown. The seismic system 100 is deployed for a land-based survey. However, the invention is not so limited. The invention may be employed in systems intended for use in aquatic environments, i.e., fresh, salt, or brackish water. As will be appreciated by those skilled in the art, such surveys are frequently referred to as "marine surveys" even if performed in fresh or brackish waters. The term is so used herein.

The system 100 includes a vibrator electronics package 105 and a seismic source 110 for generating an acoustic signal 115. For example, the seismic source 110 may be a thumper that may be coupled to a vehicle 120 such as a truck, a trailer, and the like. For another example, the seismic source 110 may be an explosive charge (not shown) that may be detonated. However, it will be appreciated that the present invention is not so limited to the aforementioned examples. In alternative embodiments, the seismic source 110 may be one of a variety of devices, well known to those of ordinary skill in the art, which may be used for seismic exploration on the ground, or in marine exploration. For example, when an alternative embodiment of the system 100 is deployed in a marine environment, the seismic source 110 may be an airgun (not shown), a piezoelectric source (not shown), or a hydraulic vibrator (not shown).

The vibrator electronics package 105 generally provides a pilot sweep to the seismic source 110, which uses the pilot sweep to generate the acoustic signal 115. In one embodiment, the acoustic signal 115 is a cascaded sweep. A cascaded sweep typically includes a plurality of sweeps followed by a listening period, as was described above. For example, the acoustic signal 115 may include a plurality of up-sweeps that increase from about 10 Hz to about 80 Hz that last for a preselected duration. For another example, in alternative embodiments, the preselected duration of each sweep in the acoustic signal 115 may range from about 4 seconds to about 12 seconds and the duration of the listening period may be about 4 seconds. Thus, for an exemplary acoustic signal 115 including three 4-second-long sweeps, the preselected duration of the acoustic signal 115 would be 12 seconds. Although the following discussion will assume that the sweep pattern is a cascaded sweep, the present invention is not limited to cascaded sweeps. In alternative embodiments, the acoustic signal 115 may be a slip sweep, or any other desirable sweep pattern without departing from the scope of the present invention.

The system 100 also includes one or more seismic sensors 125 deployed proximate to the seismic source 110. For example, the seismic sensor 125 may be a geophone or a hydrophone, depending on the type of survey being conducted. In the illustrated embodiment, the seismic sensor 125 is a geophone. The seismic sensors 125 receive a reflected signal 130 that is formed when the acoustic signal 115 reflects from a geologic formation 135 such as a hydrocarbon deposit embedded between sediment layers 140, 145. In one embodiment, the seismic sensors 125 receive the reflected signal 130 during the preselected duration of the acoustic signal 115 and the listening period.

The seismic sensors 125 transmit the reflected signal 130 to a signal processing unit 150. In one embodiment, the seismic sensors 125 may record the reflected signal 130 to a recording tape (not shown). The reflected signal 130 is then transmitted to the signal processing unit 150 by transporting the recording tape from the seismic sensors 125 to the signal processing unit 150. However, in alternative embodiments, the reflected signal 130 can be stored and transmitted to the signal processing unit 150 in a similar manner using any storage medium, including, but not limited to, magnetic disks, compact disks, and DVDs. Furthermore, in yet another set of possible embodiments, the reflected signal 130 may be transmitted to the signal processing unit 150 via electrical or optical wires, cables, or fibers, as well as wireless transmission devices such as a radio-frequency transmitter and the like.

Similarly, in one embodiment, the vibrator electronics package 105 transmits pilot sweep to the signal processing unit 150. However, in a preferred embodiment, discussed in detail below, the signal processing unit 150 also generates the pilot sweep. Although FIG. 1 depicts the signal processing unit 150 as proximate to the vehicle 120 and the seismic sensors 125, the present invention is not so limited. In alternative embodiments, the signal processing unit 150, or selected portions thereof, may be positioned in the seismic sensors 125, on the vehicle 120, in a remote building (not shown), or at any other desirable location without departing from the scope of the present invention.

As described in more detail below, the signal processing unit 150 correlates the pilot sweep and the reflected signal 130 to form one or more correlation data sets, which are generally used to locate and/or survey the geologic formation 135. However, noise in the correlated data sets degrades the quality of the cross-correlation data set, in some cases obscuring the geologic formations 135 that seismic exploration is supposed to detect. For example, the acoustic signal 115 may contain harmonic noise which is difficult to remove from the correlated data sets because of amplitude and/or phase errors in the acoustic signal 115. Thus, in accordance with one embodiment of the present invention, the signal processing unit 150 estimates the noise in the correlation data set and subtracts the estimated noise from the correlation data set.

Figure 2:
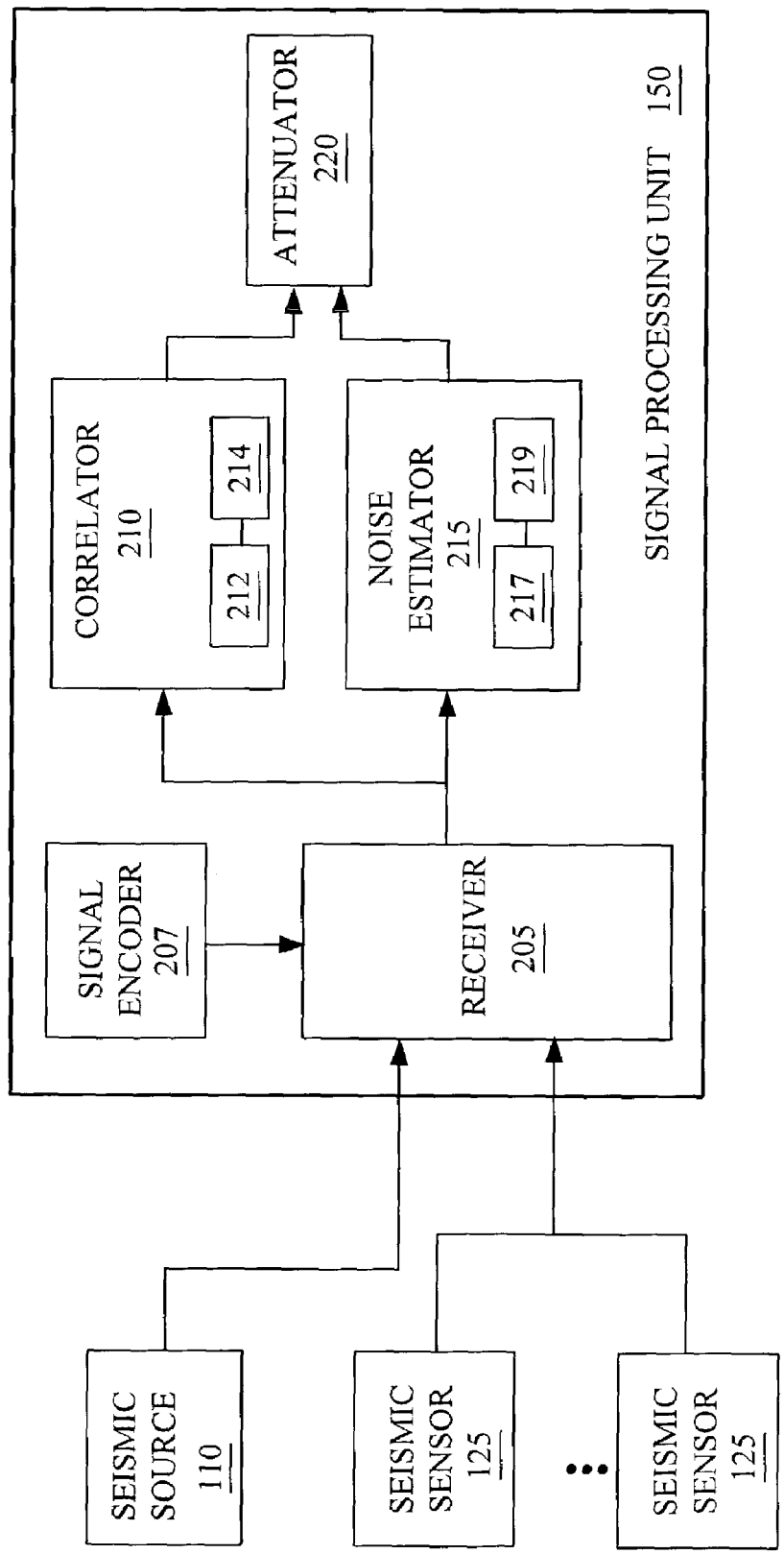
FIG. 2 shows a signal processing unit that may be used in the system shown in FIG. 1.

FIG. 2 shows one embodiment of the signal processing unit 150. A receiver 205 in the signal processing unit 150 communicates with the seismic source 110 and the one or more seismic sensors 125. The signal processing unit 150, as was discussed above, communicates with the seismic source 110 and/or seismic sensors 125 by any one of a variety of recording devices and/or transmission devices.

The seismic sensors 125 record the reflected signals 130 on recording tape, which is transported to the signal processing unit 150. The receiver 205 in this embodiment is therefore a tape drive. However, as previously discussed, the present invention is not so limited. In alternative embodiments, the one or more seismic sensors 125 may be communicatively coupled to the receiver 205 in any desirable manner including, but not limited to, electromagnetic transmissions such as wireless radio-frequency signals and/or optical signals, conductive wires, optical fibers, transportable media such as magnetic storage disks or tapes, and the like. Consequently, in alternative embodiments, the receiver 205 may take a variety of forms including, but not limited to, a radio-frequency transceiver, a processor-based device for processing digital signals, an optical signal transceiver, a disk drive, and the like.

In one preferred embodiment, a signal encoder 207 is included in the signal processing unit 150. The signal encoder 207 generates the pilot sweep such that it is synchronized with the pilot sweep generated by the vibrator electronics package 105. The signal encoder 207 then provides the pilot sweep to the receiver 205. However, in alternative embodiments, the vibrator electronics package 105 may transmit the pilot sweep to the receiver 205 in a variety of manners, as described above.

The receiver 205 provides the pilot sweep and the reflected signals 130 shown in FIG. 1 to a correlator 210. In one embodiment, the receiver 205 provides the pilot sweep and the reflected signals 130 to the correlator 210 in digital form and the correlator 210 includes a processor-based device 212 that may execute software stored in a computer readable, program storage medium 214. However, in alternative embodiments, the correlator 210 may be any desirable device for correlating the pilot sweep and the reflected signals 130 without departing from the scope of the present invention. For example, the correlator 210 may be an analog device capable of correlating analog signals provided by the receiver 205.

The correlator 210 forms one or more correlated data sets by correlating the pilot sweep and the reflected signals 130. In the illustrated embodiment, the processor-based device 212 in the correlator 210 then executes software stored in the computer readable, program storage medium 214 to perform a cross-correlation of the pilot sweep and the reflected signals 130 and form the one or more correlated data sets.

The receiver 205 also provides the pilot sweep and the reflected signals 130 to a noise estimator 215, in accordance with one embodiment of the present invention. As described in more detail below, the noise estimator 215 uses the pilot sweep and reflected signals 130 to form an estimate of the noise in the reflected signals 130. In one embodiment, the noise estimator 215 includes a processor-based device 217 and a computer readable, program storage medium 219. The processor-based device 217 then executes software stored in the computer-readable, program storage medium 219 that forms an estimate of the noise in the reflected signals 130. However, in alternative embodiments, the noise estimator 215 may be any desirable device for estimating the noise in the reflected signals 130 in the manner described below. For one example, although FIG. 2 depicts the processor-based device 217 and the computer readable, program storage medium 219 included in the noise estimator 215 as distinct from the processor-based device 212 and the computer readable, program storage medium 214 included in the correlator 210, the noise estimator 215 may, in alternative embodiments, be implemented using the processor-based device 212 and software stored in the computer readable, program storage medium 214. For another example, the noise estimator 215 may be an analog device capable of estimating the noise in analog signals provided by the receiver 205.

The correlator 210 and the noise estimator 215 provide the correlated data set and the noise estimate, respectively, to an attenuator 220, which combines the correlated data set and the noise estimate to remove at least a portion of the noise from the correlated data set. In one embodiment, the correlator 210 and the noise estimator 215 provide the correlated data set and noise estimate to the attenuator 220 in a digital format. The attenuator 220 then digitally subtracts the noise estimate from the correlated data set. It will, however, be appreciated that the present invention is not so limited. In alternative embodiments, the correlator 210 and the noise estimator 215 may provide the correlated data set and the noise estimate to the attenuator 220 in any desirable format and the attenuator 220 may use any desirable algorithm to remove the portion of the noise from the correlated data set. For example, in alternative embodiments, the attenuator 220 may adaptively subtract the noise from the correlated data sets.

Figure 3A:
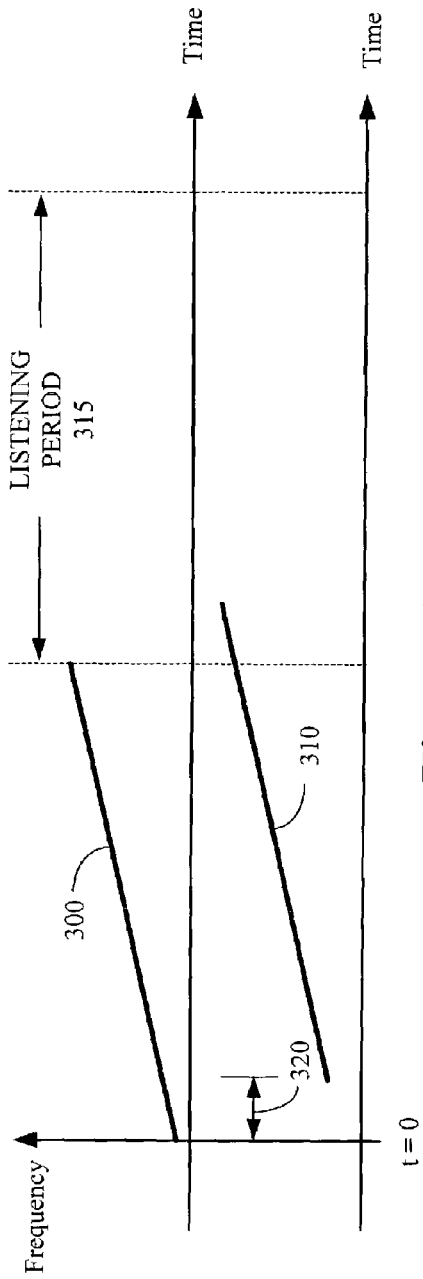
FIGS. 3A-B each show aspects of an exemplary sweep and a sweep data set that may be formed by the signal processing unit shown in FIG. 2.

FIG. 3A shows a frequency-time plot that illustrates an exemplary conventional pilot sweep 300 and a reflected signal 310 such as may be produced by the seismic source 110 and received by the seismic sensor(s) 125. In one embodiment, during a seismic survey, the vibrator electronics package 105 generates the pilot sweep 300, which is used by the seismic source 110 to generate the signal that propagates into the ground, e.g., as the acoustic signal 115. In one embodiment, the pilot sweep 300 begins at a time t=0 and lasts for a predetermined time period. For example, the predetermined time period may be about 4 seconds. In the embodiment depicted in FIG. 3A, the pilot sweep 300 is an up-sweep having a frequency that rises with time. Although the pilot sweep 300 is depicted as rising linearly from beginning to end, it will be appreciated that the present invention is not so limited. In alternative embodiments, the pilot sweep 300 may rise and/or fall in any desirable pattern, or even rise and/or fall randomly, without departing from the scope of the present invention.

The seismic source 110 stops generating the pilot sweep 300 after the predetermined time period and then remains silent for a listening period 315. For example, the listening period 315 may be about 4 seconds. During the pilot sweep 300 and the listening period 315, the seismic sensors 125 receive the reflected signal 310, produced when the acoustic signal 115 is reflected, e.g., as the reflected signal 130, by underlying geologic formations (e.g., the geologic formation 135 shown in FIG. 1). The reflected signal 310 may be received by the seismic sensors 125 after a delay 320 that depends on the shape and location of the geologic formation 135, as well as the properties of the material through which the signal 310 propagates, such as density and composition. Although the reflected signal 310 is depicted as having a single delay 320 and as rising linearly from beginning to end, it will be appreciated that the reflected signal 310 depicted in FIG. 3A is an idealized representation. In reality, complicated geometries of the geologic formations 135 may result in a range of delays 320 that may spread the reflected signal 310 over a wider range of times than shown in FIG. 3A. Additionally, the reflected signal 310 may contain harmonics that are not shown in FIG. 3A.

Figure 3B:
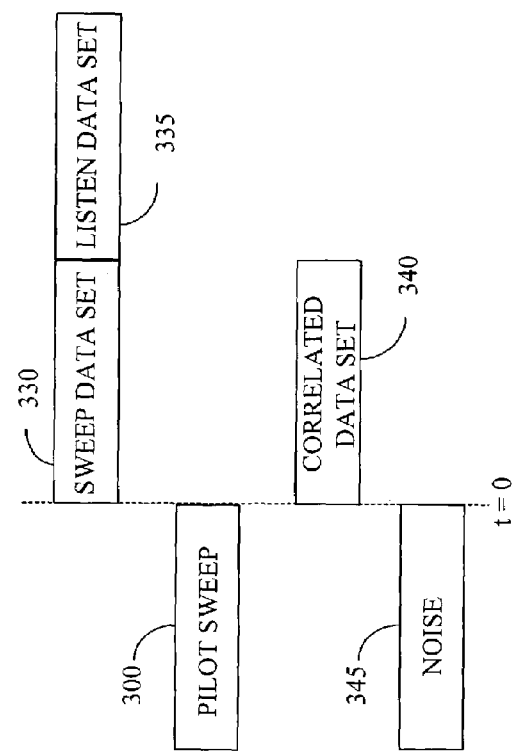

The seismic sensors 125 form a sweep data set 330 during the pilot sweep 300, as shown in FIG. 3B. In one embodiment, the seismic sensors 125 may record a signal, which may include at least a portion of the reflected signal 310, during the pilot sweep 300. This is referred to as the "sweep data set" 330. Similarly, the seismic sensors 125 may form a listen data set 335 by recording the reflected signal 310 during the listening period 315. The seismic sensors 125 then transmit the sweep data set 330 and the listen data set 335 to the signal processing unit 150 (as shown in FIGS. 1 and 2), which forms a correlated data set 340 using the sweep data set 330, the listen data set 335, and the pilot sweep 300, as described above. For example, the signal processing unit 150 may be a processor-based device (not shown) that may execute software which may cross-correlate the sweep data set 330, the listen data set 335, and the pilot sweep 300. The resulting correlated data set 340 generally maps to positive time-lags, e.g., t>0.

The reflected signal 310 generally includes one or more harmonics (not shown) that produce noise 345. A portion of the harmonic noise 345 may map to different time-lags than the correlated data set 340. For example, in one embodiment, the pilot sweep 300 may be an up-sweep and a portion of the harmonic noise 345 may map to negative time-lags, e.g., t<0. In an alternative embodiment, not shown in FIGS. 3A-B, the pilot sweep 300 may be a down-sweep and the harmonic noise 345 may map to positive time-lags, e.g., t>0, which are greater than the positive time lags of the correlated data set 340. Thus, an estimate of the harmonic noise 345 may be formed by ignoring data at the appropriate time-lags.

Figure 4A:
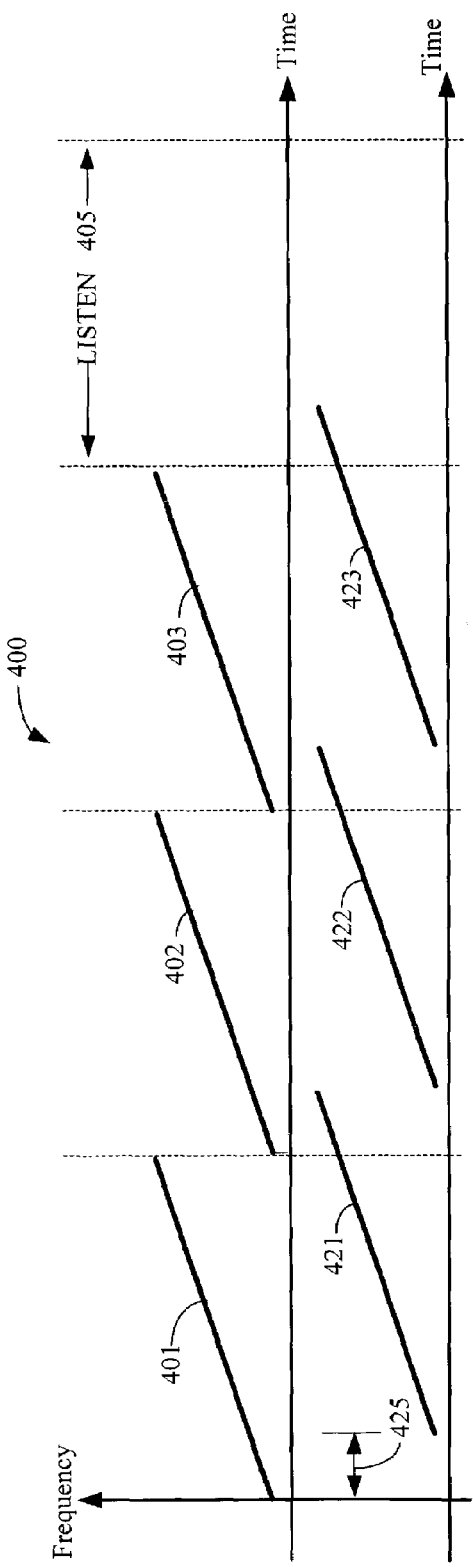
FIGS. 4A-B each show aspects of an exemplary cascaded sweep and a cascaded sweep data set that may be formed by the signal processing unit shown in FIG. 2.

FIG. 4A shows a frequency-time plot of an exemplary cascaded sweep 400 alternative to the pilot sweep 300 in FIG. 3A. In one embodiment, the cascaded sweep 400 may include a plurality of pilot sweeps 401, 402, 403 followed by a listening period 405. In the illustrated embodiment, the cascaded sweep 400 is formed by generating a plurality of up-sweeps of the type described above. However, in alternative embodiments, each of the plurality of pilot sweeps 401, 402, 403 may be a down-sweep or any other desirable sweep pattern without departing from the scope of the present invention. It will also be appreciated by those of ordinary skill in the art having benefit of the present disclosure that the cascaded sweep 400 may include more or fewer pilot sweeps 401, 402, 403 and listening periods 405 without departing from the scope of the present invention.

Each sweep 401, 402, 403 in the cascaded sweep 400 may also have a different phase, P(t). In one embodiment, the phase P(t) of the pilot sweeps 401, 402, 403 is determined by the formulae:

$P(t) = f_o * t + R * t^2/2 + P_o,$ $S(t) = A \sin(P(t))$ where $f_o$ is the starting frequency of the sweep, $P_o$ is the initial phase, S(t) is the pilot sweep 401, 402, 403 and R is the sweep rate, which is defined by the formula $R = (f_1 - f_o)/T$, where $f_1$ is the ending frequency of the sweep and T is the sweep length. The phase P(t) of different pilot sweeps 401, 402, 403 may be varied by changing $P_o$. For example, Po may be 0 for the pilot sweep 401, $2\pi/3$ for the pilot sweep 402, and $4\pi/3$ for the pilot sweep 403. Generally, the phase P(t) is selected so that at least a portion of the harmonic noise cancels when the reflected signals are combined, as described below. However, in alternative embodiments, any desirable formula may be used to determine the phase, P(t), without departing from the scope of the present invention.

Figure 4B:
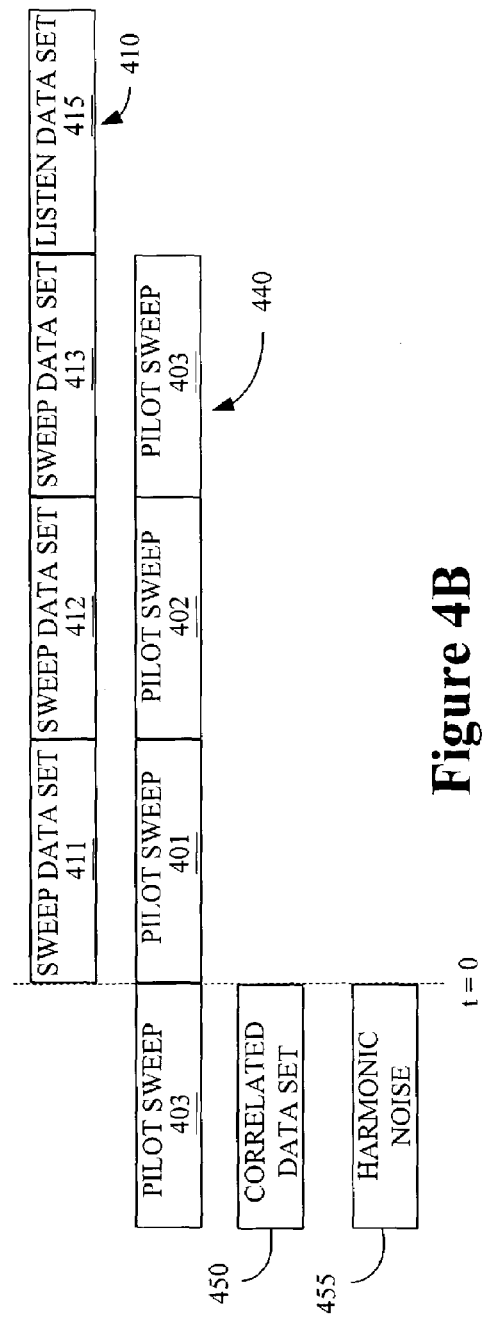

As shown in FIG. 4B, the seismic sensors 125 record a cascaded sweep data set 410 during the pilot sweep 400. In one embodiment, the cascaded data set 410 includes a plurality of sweep data sets 411, 412, 413 and a listening data set 415 that are recorded during each of the pilot sweeps 401, 402, 403 and the listening period 405, respectively. The cascaded data set 410 may include at least a portion of a plurality of reflected signals 421, 422, 423 that are produced when acoustic signal 115 formed using the pilot sweeps 401, 402, 403 in the cascaded sweep 400 is reflected by underlying geologic formations (e.g., the geologic formation 135 shown in FIG. 1). The reflected signals 421, 422, 423 are received by the seismic sensors 125 after a delay 425 that depends on the shape and location of the geologic formation 135. As discussed above with regard to FIGS. 3A-B, the reflected signals 421, 422, 423 depicted in FIG. 4A are idealized representations. In reality, the reflected signals 421, 422, 423 may contain harmonics.

In one embodiment, a correlation reference sequence 440 is formed by adding the pilot sweep 403 to the beginning of the pilot sweeps 401, 402, 403. The cascaded sweep data 410 and the correlation reference sequence 440 may then be cross-correlated to form a complete correlation sequence (not shown). Generally, a correlated data set 450 is selected from the complete correlation sequence. For example, in the illustrated embodiment, the correlated data set 450 maps to negative time-lags, e.g., t<0. However, it will be appreciated by those of ordinary skill in the art having benefit of the present disclosure that, in alternative embodiments, the correlated data set 450 may map to positive time-lags, e.g., t>0.

The cascaded data sweep 410 generally includes harmonic noise 455, which maps to the same time-lag as the correlated data set 450 in the illustrated embodiment. For example, the harmonic noise 455 may map to a negative time-lag, e.g., <t<0. In theory, the contribution to the harmonic noise 455 from the sweep data sets 411, 412, 413 and the listen data set 415 should cancel because of the aforementioned phase differences between the pilot sweeps 401, 402, 403. However, in practice, amplitude and/or phase errors in the acoustic signal 115 reduce the cancellation and increase the contribution of the harmonic noise 455 to the correlated data set 450. In some cases, the harmonic noise 455 is comparable in amplitude to the reflected signal 421, 422, 423 present in the correlated data set 450 and may, consequently, obscure the geologic formations 135.

FIG. 5 shows a block diagram illustrating a plurality of correlation data subsets 501, 502, 503 that may be used to estimate the harmonic noise 455, in accordance with one embodiment of the present invention. Although FIG. 5 depicts three correlation data subsets 501, 502, 503, a person of ordinary skill in the art having benefit of the present disclosure will appreciate that more or fewer correlation data subsets 501, 502, 503 may be used without departing from the scope of the present invention. In one embodiment, the correlation data subsets 501, 502, 503 are formed by selecting a sweep data set, from, e.g., the sweep data sets 411, 412, 413 shown in FIG. 4B, and a pilot sweep from, e.g., the pilot sweeps 401, 402, 403 shown in FIG. 4B. For example, the correlation data subset 501 is formed using the sweep data set 411 and the pilot sweep 403, the correlation data subset 502 is formed using the sweep data set 412 and the pilot sweep 401, and the correlation data subset 503 is formed using the sweep data set 413 and the pilot sweep 402.

To estimate the harmonic noise 455, the sweep data set 411, 412, 413 and the pilot sweep 401, 402, 403 in each correlation data subset 501, 502, 503 are correlated. For example, the noise estimator 215 shown in FIG. 2 may cross-correlate the sweep data set 411, 412, 413 and the pilot sweep 401, 402, 403 to form the corresponding correlation data subset 501, 502, 503. In one embodiment, a plurality of negative lag signals 511, 512, 513 are selected from the negative time-lag portion of the complete correlation (not shown) formed using the sweep data set 411, 412, 413 and the pilot sweep 401, 402, 403 to form the corresponding correlation data subset 501, 502, 503. However, it will be appreciated that, in alternative embodiments, any desirable portion of the complete correlation, such as a positive time-lag signal, may be selected without departing from the scope of the present invention.

The plurality of negative lag signals 511, 512, 513 may each contain a contribution from the harmonic noise 455. In one embodiment, the plurality of negative lag signals 511, 512, 513, may also contain a contribution from the reflected signals 421, 422, 423. For example, the delay 425 may cause a high-frequency portion of the reflected signals 421, 422, 423 shown in FIG. 4A to overlap with subsequent pilot sweeps 401, 402, 403, as will be appreciated by those of ordinary skill in the art having benefit of the present disclosure. Thus, the sweep data sets 412, 413 contain a portion of the reflected signals 421, 422, 423 from more than one pilot sweep 401, 402, 403. The high-frequency portion of the reflected signals 421, 422, 423 may, in one embodiment, contribute to the negative lag signals 511, 512, 513, potentially resulting in an overestimate of the noise level.

Figure 6:
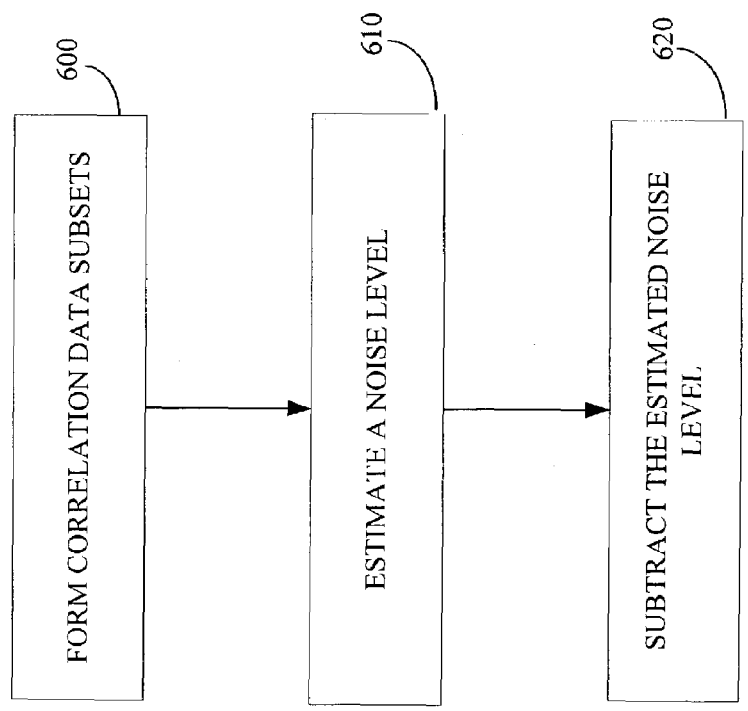
FIG. 6 shows a flow chart illustrating a method of attenuating the noise in the cascaded sweep data shown in FIG. 4.

FIG. 6 shows a flow chart depicting a method of attenuating the harmonic noise 455, in accordance with one embodiment of the present invention. The plurality of correlation data subsets 501, 502, 503 are formed (at 600) in a manner well-known to those of ordinary skill in the art having benefit of the present disclosure. For example, the noise estimator 215 forms (at 600) the plurality of correlation data subsets 501, 502, 503 and then estimates (at 610), in a manner described in detail below, the harmonic noise 455 in the correlated data set 450. In one embodiment, the estimated noise level is communicated to the attenuator 220, which subtracts (at 620) the estimated noise level from the correlated data set 450.

Figure 7:
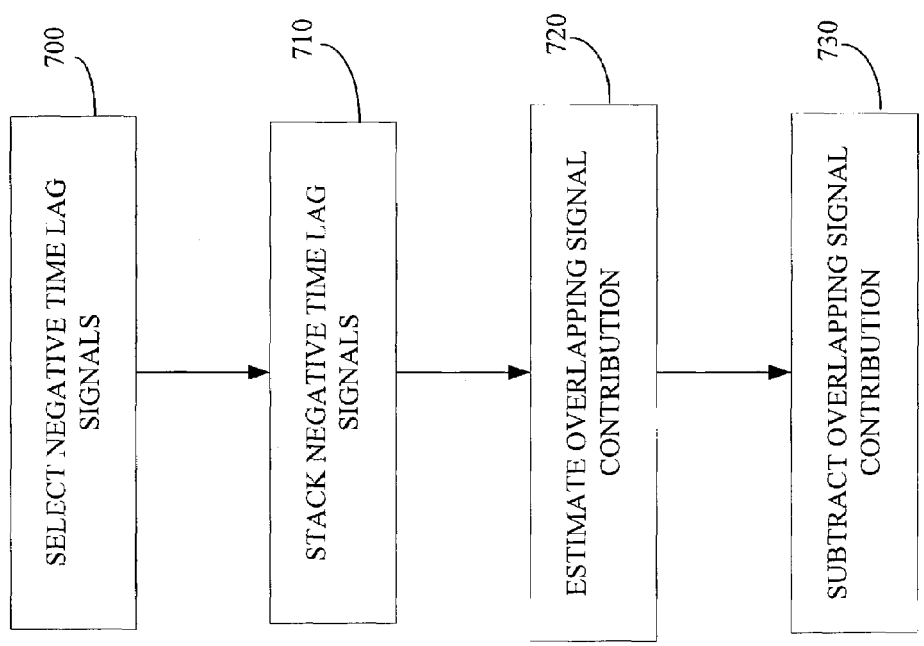
FIG. 7 shows a flow chart illustrating a method of estimating a noise level in the cascaded sweep data shown in FIG. 4.

FIG. 7 shows a flow chart depicting a method of estimating (at 610) the noise level in the correlated data set 450, in accordance with one embodiment of the present invention. As described in detail above, the negative time lag signals 511, 512, 513 are selected (at 700) from the complete correlations created by correlating the pilot sweep 401, 402, 403 and the sweep data sets 412, 413, 411, respectively. The negative time lag signals 511, 512, 513 are then stacked (at 710), in a manner known to those of ordinary skill in the art having benefit of the present disclosure. Since the sweep data sets 411, 412, 413 have different phases, P(t), stacking (at 710) the negative time lag signals 511, 512, 513 creates an estimate of the non-cancelled portion of the harmonic noise in the correlated data set 450. For example, if the seismic source 110 produces no amplitude and/or phase errors, the noise level in the correlated data set 450 would be zero. If, as is generally the case, the seismic source 110 produces amplitude and/or phase errors, the noise level in the correlated data set 450 may be non-zero.

As discussed above, the sweep data sets 412, 413 generally contain a portion of the reflected signals 421, 422, 423 from more than one pilot sweep 401, 402, 403. For example, in one embodiment, a high-frequency portion of an up-sweep signal may be recorded in a subsequent sweep data set 412, 413 and may contribute to the estimated noise level. The overlapping signal contribution to the estimated noise level is estimated (at 720) by correlating the listen data set 415 with the pilot sweep 403. In one embodiment, the estimated overlapping signal contribution is then subtracted n−1 times (at 730) from the estimated noise level, where n is the number of sweep data sets 411, 412, 413.

FIG. 8A shows a first exemplary correlation data set in one implementation of the correlation data set 450, first shown in FIG. 4, including harmonic noise 455. In the illustrated example, the harmonic noise 455 is simulated harmonic noise caused by amplitude and phase errors that are introduced into the correlated data set 450 by the seismic source 110. FIG. 8B shows the correlation data set 450 after the estimated noise level has been subtracted. In the illustrated case, high frequency portions of the correlated data set 450 have been removed. In FIG. 8C, the estimated overlapping signal contribution has been subtracted from the estimated noise level, as described above, and the resulting estimated noise level subtracted from the correlation data set 450 shown in FIG. 8A. As is evident in FIG. 8C, the high frequency contributions to the correlated data set 450 have been, at least in part, restored. Thus, by estimating the noise level in the correlation data set 450 and then subtracting the estimated noise level, the harmonic noise 455 in the correlation data set 450 has been attenuated.

FIG. 9A shows a second exemplary correlation data set 450 formed using actual field data. Harmonic noise 455 is visible in the left half of FIG. 9A starting at about 1.5 seconds and becomes stronger at later times. Using the method described above, with reference to FIG. 6, the harmonic noise 455 is estimated, and shown in FIG. 9C, and subtracted from the data shown in FIG. 9A. The resulting correlated data set, which is illustrated in FIG. 9B, now shows continuous reflections originally masked by the non-canceled harmonic noise 455 (see, for example, between 1.6 and 2.8 s).

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for processing seismic data, comprising:
   forming a plurality of correlation data subsets using a plurality of sweep data sets and a correlation reference sequence, wherein forming the plurality of correlation data subsets comprises selecting one of a plurality of pilot sweeps from the correlation reference sequence and selecting a corresponding one of the plurality of sweep data sets;
   estimating a noise level in a correlation data set using the correlation data subsets, wherein estimating the noise level comprises correlating the selected sweep data sets and pilot sweeps and selecting a portion of the correlation data subset resulting from correlating the sweep data sets and the pilot sweeps, and wherein selecting a portion of the correlation data subset comprises selecting a negative time-lag portion of the correlation data subset;
   subtracting the estimated noise level from the correlation data set; and
   forming a low noise correlation data set.

2. A method for processing seismic data, comprising:
   forming a plurality of correlation data subsets using a plurality of sweep data sets and a correlation reference sequence, wherein forming the plurality of correlation data subsets comprises selecting one of a plurality of pilot sweeps from the correlation reference sequence and selecting a corresponding one of the plurality of sweep data sets;
   estimating a noise level in a correlation data set using the correlation data subsets, wherein estimating the noise level comprises correlating the selected sweep data sets and pilot sweeps and selecting a portion of the correlation data subset resulting from correlating the sweep data sets and the pilot sweeps, and wherein selecting a portion of the correlation data subset comprises selecting a positive time-lag portion of the correlation data subset;

subtracting the estimated noise level from the correlation data set; and forming a low noise correlation data set.

3. A method for processing seismic data, comprising:

forming a plurality of correlation data subsets using a plurality of sweep data sets and a correlation reference sequence;

estimating a noise level in a correlation data set using the correlation data subsets, wherein estimating the noise level comprises estimating an overlapping signal and wherein estimating the overlapping signal comprises correlating at least one of the plurality of pilot sweeps and a listening period data set;

subtracting the estimated noise level from the correlation data set; and forming a low noise correlation data set.

4. An apparatus, comprising:

means for forming a plurality of correlation data subsets using a plurality of sweep data sets and a correlation reference sequence;

means for estimating a noise level in a correlation data set using the correlation data subsets;

means for selecting a portion of the correlation data subset resulting from correlating sweep data sets and pilot sweeps;

means for estimating an overlapping signal by correlating at least one of the plurality of pilot sweeps and a listening period data set; and means for subtracting the noise level from the correlation data set.

* * * * *